United States Patent
Homma

(10) Patent No.: US 9,810,791 B2
(45) Date of Patent: Nov. 7, 2017

(54) RADIATION DETECTOR AND METHOD FOR MANUFACTURING THE SAME

(71) Applicant: Toshiba Electron Tubes & Devices Co., Ltd., Otawara-shi (JP)

(72) Inventor: Katsuhisa Homma, Ootawara (JP)

(73) Assignee: Toshiba Electron Tubes & Devices Co., Ltd., Otawara-shi (JP)

( * ) Notice: Subject to any disclaimer, the term of this patent is extended or adjusted under 35 U.S.C. 154(b) by 0 days.

(21) Appl. No.: 14/962,730

(22) Filed: Dec. 8, 2015

(65) Prior Publication Data
US 2016/0091616 A1    Mar. 31, 2016

Related U.S. Application Data

(63) Continuation of application No. PCT/JP2014/065125, filed on Jun. 6, 2014.

(30) Foreign Application Priority Data

Jun. 13, 2013   (JP) ................................ 2013-124655

(51) Int. Cl.
G01T 1/20   (2006.01)
G01T 1/202  (2006.01)

(52) U.S. Cl.
CPC ............ G01T 1/2018 (2013.01); G01T 1/202 (2013.01)

(58) Field of Classification Search
CPC .................................................. G01T 1/2018
See application file for complete search history.

(56) References Cited

U.S. PATENT DOCUMENTS

| | | | |
|---|---|---|---|
| 4,101,781 A * | 7/1978 | Neukermans et al. | .... 250/483.1 |
| 5,179,284 A * | 1/1993 | Kingsley et al. | ........ 250/370.11 |
| 6,246,063 B1* | 6/2001 | Fukui | .......................... 250/484.4 |
| 6,262,422 B1 | 7/2001 | Homme et al. | |
| 2002/0056811 A1 | 5/2002 | Otto | |

(Continued)

FOREIGN PATENT DOCUMENTS

| CN | 102084268 A | 6/2011 |
|---|---|---|
| CN | 102667525 A | 9/2012 |

(Continued)

OTHER PUBLICATIONS

Combined Taiwanese Office Action and Search Report dated Apr. 16, 2015 in Patent Application No. 103120599 (with English Translation).

(Continued)

*Primary Examiner* — David Porta
*Assistant Examiner* — Hugh H Maupin
(74) *Attorney, Agent, or Firm* — Oblon, McClelland, Maier & Neustadt, L.L.P.

(57) ABSTRACT

According to the embodiment, a radiation detector includes an array substrate including a photoelectric conversion element, a scintillator layer formed on the photoelectric conversion element and converting radiation to fluorescence, and a moisture-proof layer including a surface-smoothing layer which is a continuous film formed to cover the scintillator layer and including at least an organic resin material as a main component and a moisture-proof layer which is a continuous film formed on a surface of the smoothed layer by direct film formation and consisting from inorganic material.

14 Claims, 10 Drawing Sheets

(56) References Cited

U.S. PATENT DOCUMENTS

| | | | |
|---|---|---|---|
| 2003/0116716 A1 | 6/2003 | Homme et al. | |
| 2006/0033032 A1 | 2/2006 | Inoue et al. | |
| 2007/0045554 A1 | 3/2007 | Wakamatsu et al. | |
| 2010/0116997 A1* | 5/2010 | Homma | H01L 27/1446 250/368 |
| 2010/0224784 A1 | 9/2010 | Homma et al. | |
| 2011/0114847 A1 | 5/2011 | Fujieda et al. | |
| 2012/0217407 A1* | 8/2012 | Iwakiri et al. | 250/366 |
| 2012/0267539 A1 | 10/2012 | Shinba et al. | |
| 2013/0026376 A1 | 1/2013 | Tokura et al. | |
| 2013/0322598 A1 | 12/2013 | Saruta et al. | |
| 2015/0010130 A1* | 1/2015 | Nakatsugawa | G21K 4/00 378/62 |

FOREIGN PATENT DOCUMENTS

| | | |
|---|---|---|
| JP | 5-242847 | 9/1993 |
| JP | 2000-284053 | 10/2000 |
| JP | 2001-330674 | 11/2001 |
| JP | 2006-17742 | 1/2006 |
| JP | 2006-78472 | 3/2006 |
| JP | 2007-59798 | 3/2007 |
| JP | 2008-170374 | 7/2008 |
| JP | 2009-128023 | 6/2009 |
| JP | 2014-13230 | 1/2014 |
| TW | 201140124 A1 | 11/2011 |

OTHER PUBLICATIONS

International Search Report dated Aug. 26, 2014 in PCT/JP2014/065125 filed on Jun. 6, 2014 (with English translation).
Written Opinion dated Aug. 26, 2014 in PCT/JP2014/065125 filed on Jun. 6, 2014.

\* cited by examiner

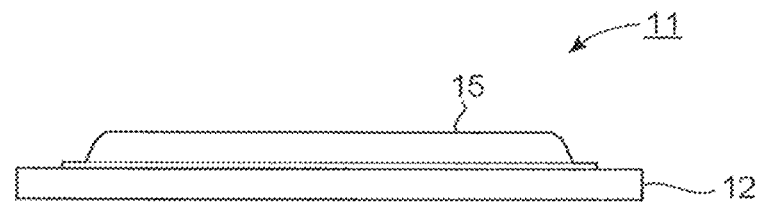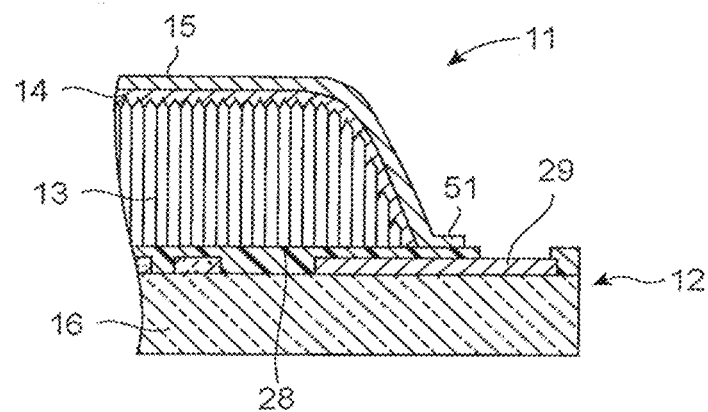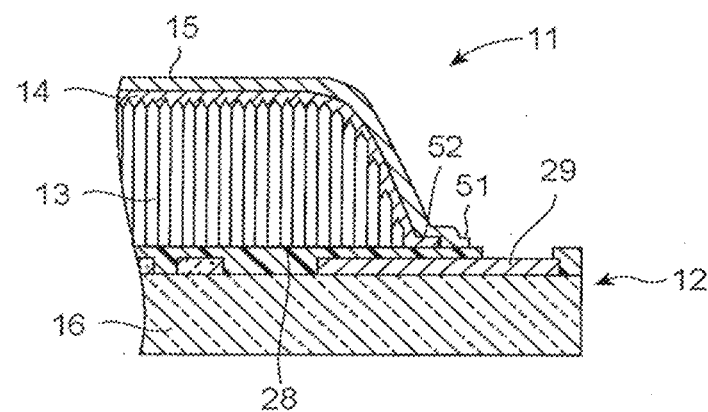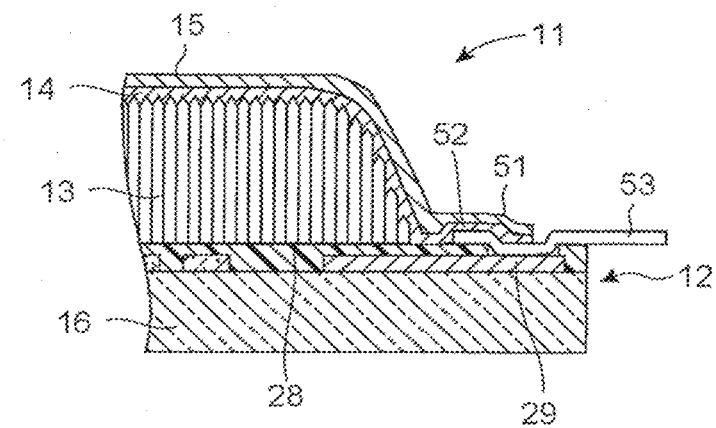

| Elapsed Time (h) of 60°C-90%RH | 0 | 24 | 96 | 240 | 500 | 1000 | 2000 | 3000 |
|---|---|---|---|---|---|---|---|---|
| Comparative Example: parylene CVD moisture-proof film | 100.0 | 72.0 | 42.0 | 27.0 | 16.0 | | | |
| Comparative Example: TiO2 reflection film + AL hat moisture-proof layer/bonding layer sealing structure | 100.0 | 102.0 | 99.5 | 99.2 | 99.3 | 98.3 | 97.6 | 96.3 |
| Working Example: (smoothed layer + sputtering SiO2 film gas barrier layer) | 100.0 | 99.0 | 98.0 | 98.0 | 96.0 | 94.6 | 93.2 | 90.3 |
| Working Example: (smoothed layer + sputtering AL film gas barrier layer) | 100.0 | 100.5 | 98.6 | 97.8 | 96.8 | 95.2 | 93.8 | 91.2 |
| Working Example: (smoothed layer + EB deposition SiO2 film gas barrier layer) | 100.0 | 99.2 | 97.3 | 96.4 | 95.3 | 93.8 | 92.0 | 90.1 |
| Working Example: (smoothed layer + EB deposition AL film gas barrier layer) | 100.0 | 100.3 | 99.5 | 98.1 | 96.3 | 94.2 | 93.5 | 91.8 |
| Working Example: (smoothed layer + PECVD SiO2 film gas barrier layer) | 100.0 | 100.5 | 101.3 | 99.8 | 99.5 | 99.2 | 98.9 | 97.0 |
| Working Example: (smoothed layer + PECVD Si-N film gas barrier layer) | 100.0 | 101.4 | 101.2 | 100.2 | 99.6 | 99.3 | 98.3 | 97.5 |
| Working Example: (smoothed layer + PECVD Si-O-N film gas barrier layer) | 100.0 | 100.2 | 101.3 | 99.9 | 99.7 | 99.5 | 98.1 | 97.8 |
| Working Example: (smoothed layer TiO2 fine particle addition + sputtering AL film gas barrier layer) | 100.0 | 100.5 | 98.3 | 97.2 | 96.0 | 95.0 | 92.6 | 90.1 |
| Working Example: (smoothed layer + sputtering AL film gas barrier layer)×2 | 100.0 | 101.0 | 101.3 | 99.6 | 99.3 | 99.2 | 98.9 | 98.5 |
| Working Example: (smoothed layer + sputtering AL film gas barrier layer)×3 | 100.0 | 101.0 | 100.8 | 100.5 | 100.2 | 99.9 | 99.5 | 99.1 |

FIG. 11

| Inorganic Film Composition | Vacuum Deposition | Sputtering | PE-CVD |
|---|---|---|---|
| A L | heating method=EB<br>raw material pellet=pure AL(4N)<br>substrate temperature≒120°C<br>film formation rate=2.0μm/h | method=DC magnetron sputtering<br>target=pure AL(3N)<br>substrate temperature≒100°C<br>sputtering gas=Ar<br>film formation rate=1.0μm/h | — |
| Si-O | heating method=EB<br>raw material pellet=melted SiO2<br>substrate temperature≒120°C<br>film formation rate=1.0μm/h | method=RF magnetron sputtering<br>target=SiO2<br>substrate temperature≒100°C<br>sputtering gas=10% O₂-Ar<br>film formation rate=1.0μm/h | method=RF<br>introduction gas=10% O₂-SiH₄<br>substrate temperature≒100°C<br>film formation rate=2.0μm/h |
| Si-N | heating method=EB<br>raw material pellet=sintered Si₃N₄<br>substrate temperature≒120°C<br>film formation rate=0.6μm/h | method=RF magnetron sputtering<br>target=Si₃N₄ sintered<br>substrate temperature≒100°C<br>sputtering gas=20% N₂-Ar<br>film formation rate=0.5μm/h | method=RF<br>introduction gas=50% N₂-SiH₄<br>substrate temperature≒100°C<br>film formation rate=0.8μm/h |
| Si-O-N | heating method=EB(2 targets)<br>raw material pellet 1=melted SiO2<br>raw material pellet 2=sintered Si₃N₄<br>substrate temperature≒120°C<br>film formation rate=1.6μm/h | method=RF magnetron sputtering<br>target=50wt.% Si₃N₄<br>+50wt.% SiO2 sintered<br>substrate temperature≒100°C<br>sputtering gas=10% N₂-Ar<br>film formation rate=0.7μm/h | method=RF<br>introduction gas=30% N₂-SiH₄<br>substrate temperature≒100°C<br>film formation rate=1.0μm/h |

FIG. 12

RADIATION DETECTOR AND METHOD FOR MANUFACTURING THE SAME

CROSS-REFERENCE TO RELATED APPLICATIONS

This application is based upon and claims the benefit of priority from Japanese Patent Application No. 2013-124655, filed on Jun. 13, 2013 and PCT Patent Application PCT/JP2014/065125, filed on Jun. 6, 2014; the entire contents of which are incorporated herein by reference.

FIELD

Embodiments described herein relate generally to a radiation detector and a method for manufacturing the same.

BACKGROUND

A planar type X-ray detector based on an active matrix has been developed as a new-generation X-ray diagnosis detector. By detecting the X-ray applied to this X-ray detector, an X-ray imaged image or an X-ray image of real time are output as a digital signal. In the X-ray detector, the X-ray is converted to visible light, namely, fluorescence by a scintillator layer, and the fluorescence is converted to a signal charge by a photoelectric conversion element such as an amorphous silicon (a-Si) photodiode or CCD (Charge Coupled Device), and thereby an image is acquired.

A material of the scintillator layer generally includes cesium iodide (CsI):sodium (Na), cesium iodide (CsI):thallium (Tl), sodium iodide (NaI), or oxysulfide gadolinium ($Gd_2O_2S$). $Gd_2O_2S$ is formed by mixing powder of sintered body with a binder resin and film coating, or used as an integrated sintered body. A method of improving resolution is conceived by forming a groove on these coated films or the sintered body by dicing or the like. The resolution characteristics of the CsI:Tl film and the CsI:Na film can be improved by causing a columnar structure to be formed by a vacuum deposition. A material of a scintillator includes various types described above and is used differently depending on application and necessary characteristics.

A reflection film may be formed on an upper portion of the scintillator layer in order to increase utilization efficiency of fluorescence and improve sensitivity characteristics. That is, fluorescence entering a photoelectric converter side is increased by reflecting fluorescence toward an opposite side to the photoelectric converter side of fluorescence emitted from the scintillator layer by the reflection film.

As an example of the reflection film, a method of forming a metal layer having a high fluorescence reflectance such as a silver alloy and aluminum on the scintillator layer, and a method of forming by applying a light scattering reflective reflection film made of a binder resin and a light scattering substance such as $TiO_2$ are known. A method of reflecting scintillator light by causing a reflection plate having a metal surface such as aluminum to adhere to the scintillator layer instead of forming on the scintillator film is also put to practical use.

A moisture-proof structure for suppressing degradation of characteristics due to humidity or the like by protecting the scintillator layer, the reflection layer, or the reflection plate or the like from external atmosphere is an important constituent feature for making the detector a practical product. Particularly, in the case where the CsI:Tl film and the CsI:Na film which are highly degradative materials to the humidity are used as the scintillator layer, high moisture-proof performance is required.

The moisture-proof structure includes a method of using a CVD film of polyparaxylylene or a structure of surrounding the surrounding of the scintillator with an enclosure member to seal by combination with a moisture-proof layer or the like. As a structure capable of obtaining further high moisture-proof performance, a structure of processing an aluminum foil or the like having excellent moisture-proof performance into a hat-shape including the scintillator layer and sealing with a bonding layer at a periphery of the scintillator is known.

BRIEF DESCRIPTION OF THE DRAWINGS

FIG. 6 is a side view of the radiation detector according to the embodiment;

FIG. 7 is an enlarged cross-sectional view in the vicinity of the radiation detector according to the embodiment;

FIG. 8 is an enlarged cross-sectional view in the vicinity of the radiation detector according to a variation of the embodiment;

FIG. 9 is an enlarged cross-sectional view in the vicinity of the radiation detector according to one other variation of the embodiment;

FIG. 11 is a table showing results of a high temperature and high humidity test of the radiation detector according to the embodiment;

FIG. 12 is a table showing an example of a film formation condition of a moisture-proof layer according to the embodiment;

DETAILED DESCRIPTION

Figure 1:
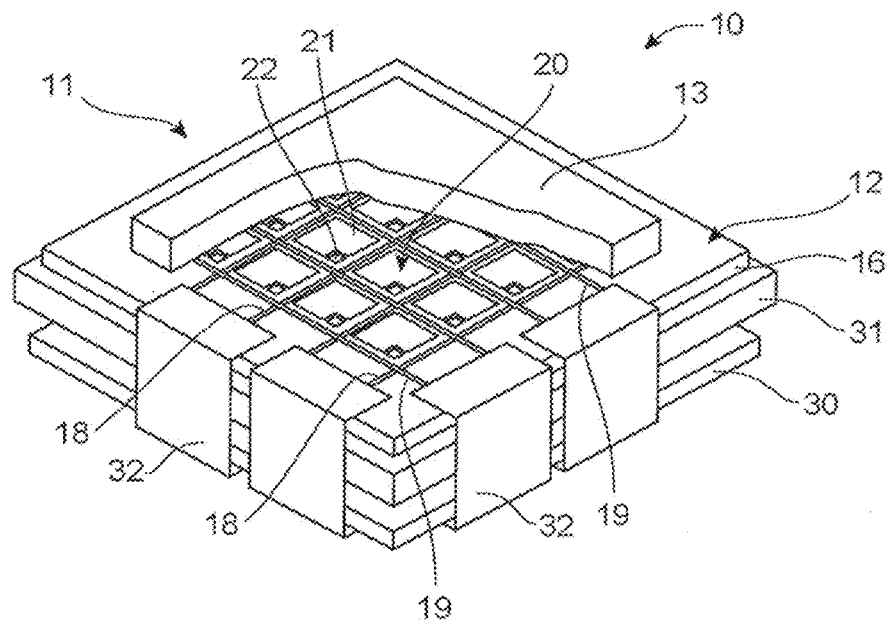
FIG. 1 is a schematic perspective view of a radiation detector according to an embodiment.

In the case where a polyparaxylylene CVD film is used as a moisture-proof structure protecting a scintillator layer or the like, water vapor barrier property is often insufficient in at least a practical film thickness range (for example, approximately 20 μm). As a specific example, results of producing a sample experimentally using a CsI:Tl film (film thickness 600 μm) as the scintillator film on a glass substrate for confirmation of moisture-proof performance and the polyparaxylylene CVD film (20 μm) as a moisture-proof layer, and investigating changes of luminance and resolution in a high temperature and high humidity test are described generally in the following.

The luminance and the resolution have been measured by applying the X-ray from the scintillator film side and focusing a CCD camera on an interface between the glass substrate and the CsI:Tl film from the glass substrate side. The luminance is a relative luminance to a Fuji film intensifying screen (HG-H2 Back), CTF (Contrast Transfer Function) of 2 Lp/mm is measured from a resolution chart image to be the resolution, and are an index, respectively.

The samples produced in this way have the luminance and the resolution greatly changing in a high temperature and high humidity life test at 60° C.-90% RH. Degradation of the resolution is particularly prominent, and a value of CTF (2 Lp/mm) decreases to approximately 80% of an initial value in 24 H. As a result of figure observation by SEM for phenomenon analysis under the low resolution, it has been found that a pillar structure of the CsI:Tl film which is highly independent in an initial stage, however fusion between the pillars occur in the sample in which the resolution is degraded in the high temperature and high humidity test. It is considered that the fusion between the pillars causes the light guide effect to be degraded and leads to the resolution decrease.

In the case of the structure sealing by surrounding the periphery of the scintillator with the enclosure member and combining with the moisture-proof layer, the enclosure member is generally a rigid substance such as a metal, a crack and detachment of a seal portion are easy to occur in a reliability test such as a cooling/heating cycle and a thermal shock due to a thermal expansion rate difference between the glass substrate and the enclosure member or between a cover and the enclosure member. In such a case, the moisture-proof performance is reduced fatally. Because of bonding and sealing on and under the enclosure member, moisture permeation amount through a resin seal material results in clearly increasing compared with the case of one seal surface.

In a structure that a foil or a thin plate made of material which is excellent in the moisture-proof performance such as aluminum is formed in a hat-shape with a depth housing the scintillator layer and sealed by the bonding layer at the periphery of the scintillator, particularly excellent performance of moisture-proof can be obtained. However, because of the structure that a hat-shaped brim portion and an array substrate including the photoelectric conversion element formed are bonded by the bonding layer, a dimension applied to the bonding layer requires, for example, a brim width of approximately 5 mm. It is necessary to secure a bonding area corresponding to the brim of the AL hat on the array substrate including the photoelectric conversion element.

This bonding area is usually formed outside an effective pixel region. Furthermore, an electrode pad connecting wirings used for receiving and transmitting electrical signal from the external is formed outside the bonding area, and the array substrate terminates with a usual space of approximately 1 mm further outside. In order to secure the bonding area, the dimension of the array substrate increases, for example, by 5 mm around one side of the array substrate and by 10 mm on both ends of the array substrate. This necessary dimension directly leads to increase of an outside dimension of a chassis. The X-ray detector and the radiation detector often have cases of required specification which is important in downsizing of the chassis, and the dimension needed for the moisture-proof area is not favorable.

The purpose of the embodiment is to provide a moisture-proof structure which is excellent in moisture-proof performance of the scintillator layer of the radiation detector and is highly reliable to a temperature change in the cooling/heating cycle and the thermal shock or the like.

According to an embodiment, a radiation detector includes an array substrate including a photoelectric conversion element, a scintillator layer formed on the photoelectric conversion element and converting radiation to fluorescence, and a moisture-proof layer including a surface-smoothing layer which is a continuous film formed to cover the scintillator layer and including at least an organic resin material as a main component and a moisture-proof layer which is a continuous film formed on a surface of the surface-smoothing layer by direct film formation and consisting from inorganic material.

According to the embodiment, a method for manufacturing a radiation detector is disclosed. The method can include forming a scintillator layer converting radiation to fluorescence on a surface of an array substrate including a photoelectric conversion element, forming a surface-smoothing layer to cover the scintillator layer, the surface-smoothing layer being formed by drying after changing an organic resin material to coating liquid by dissolving by a solvent and coating on the scintillator layer, and forming a moisture-proof layer which is a continuous film formed on a surface of the surface-smoothing layer by direct film formation and including an inorganic material.

A radiation detector according to an embodiment will be described with reference to drawings. The same or similar constitutions are marked with the same reference numerals, and an overlapped description is omitted.

Figure 2:
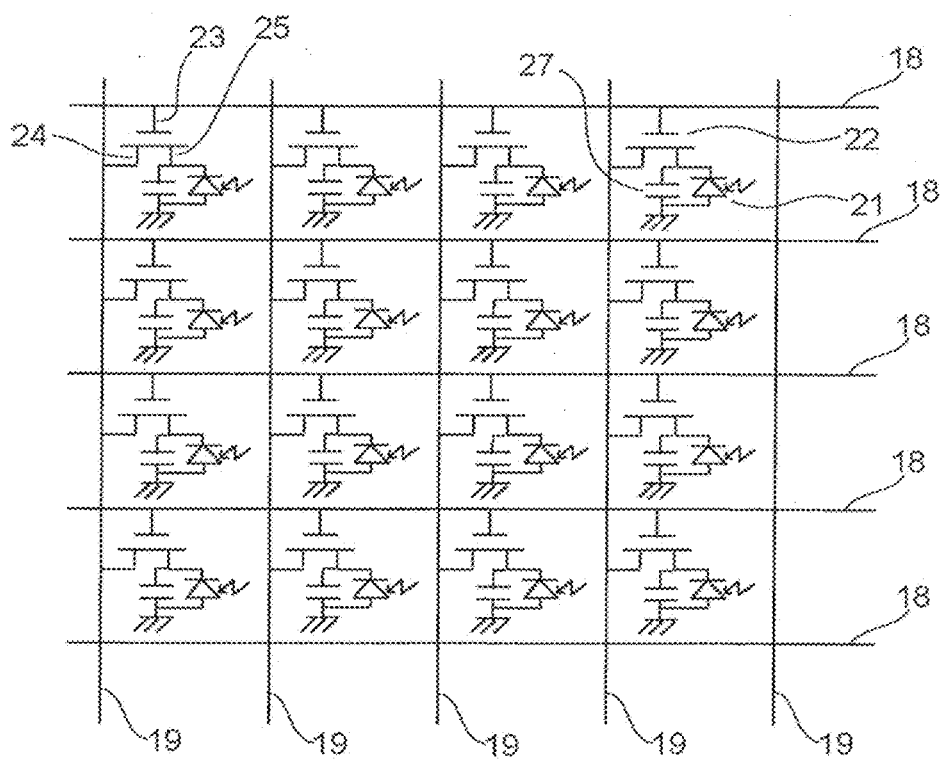
FIG. 2 is a circuit diagram of an array substrate of the radiation detector according to the embodiment.
Figure 3:
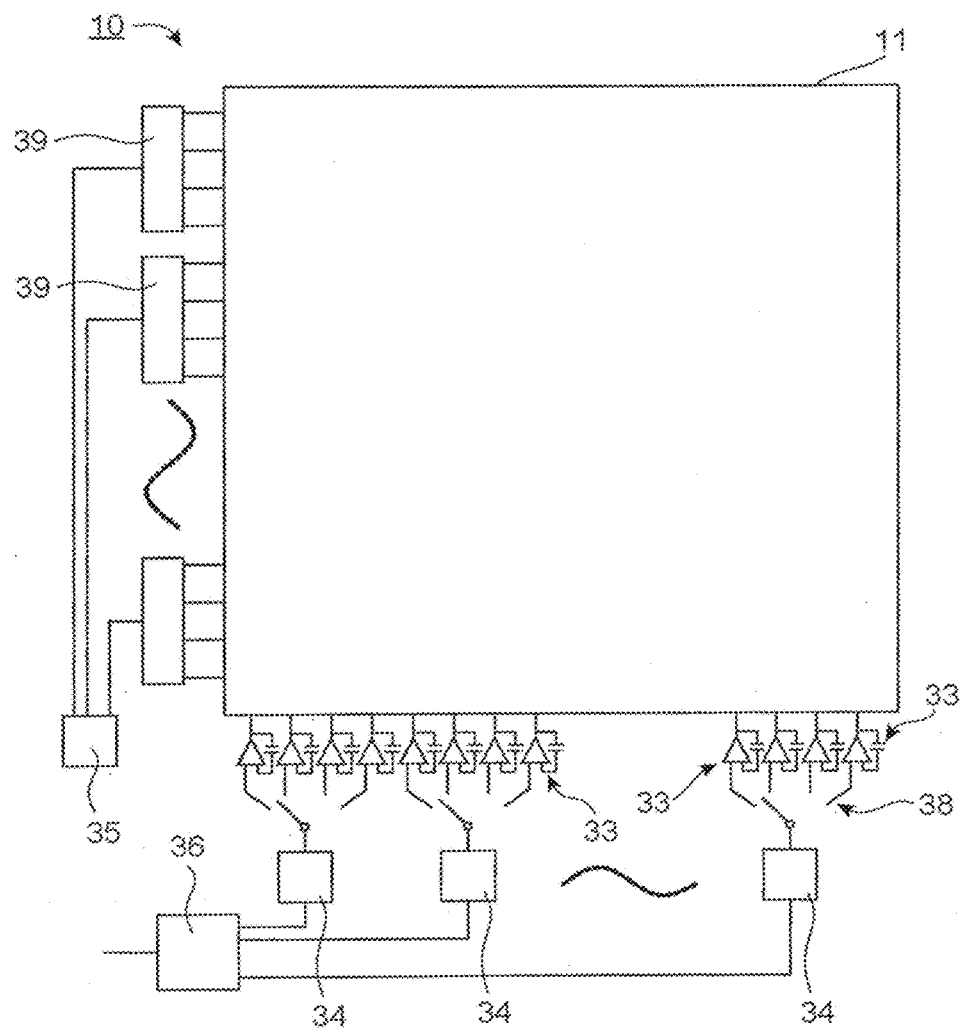
FIG. 3 is a block diagram of the radiation detector according to the embodiment.
Figure 4:
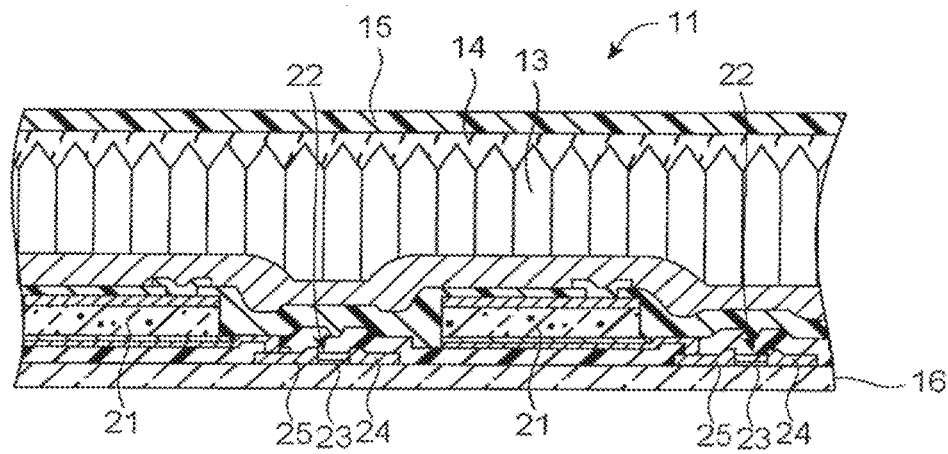
FIG. 4 is a partially enlarged cross-sectional view of a cross section of the radiation detector according to the embodiment.
Figure 5:
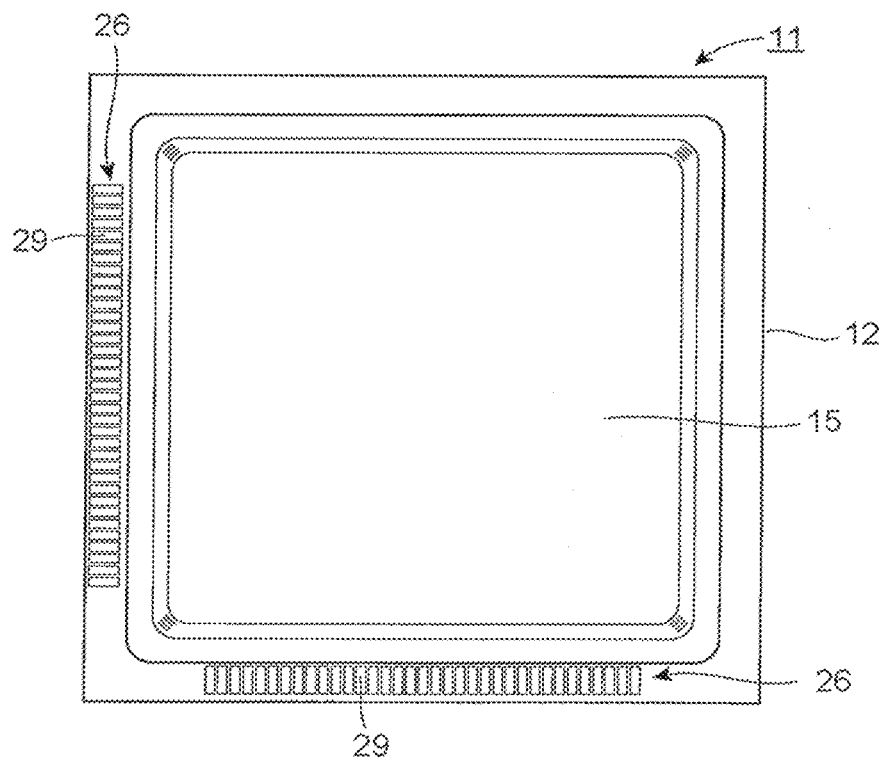
FIG. 5 is a top view of the radiation detector according to the embodiment.

FIG. 1 is a schematic perspective view of a radiation detector according to an embodiment. FIG. 2 is a circuit diagram of an array substrate of the radiation detector according to the embodiment. FIG. 3 is a block diagram of the radiation detector according to the embodiment. FIG. 4 is a partially enlarged cross-sectional view of a cross section of the radiation detector according to the embodiment. FIG. 5 is a top view of the radiation detector according to the embodiment. FIG. 6 is a side view of the radiation detector according to the embodiment.

A radiation detector 11 of the embodiment is an X-ray planar sensor detecting an X-ray image which is a radiation image, for example, is used for a general medical application or the like. A radiation detector 10 includes the radiation detector 11, a support plate 31, a circuit board 30, and a flexible substrate 32. The radiation detector 11 includes an array substrate 12 and a scintillator 13. The radiation detector 11 detects an incident X-ray and converts to fluorescence, and converts the fluorescent to an electric signal. The radiation detector 10 drives the radiation detector 11 and outputs the electric signal outputted from the radiation detector 11 as image information. The image information outputted by the radiation detector 10 is displayed on an external display or the like.

The array substrate 12 is a photoelectric conversion substrate converting the fluorescence to the electric signal. The array substrate 12 includes a glass substrate 16. A plurality of fine pixels 20 are arranged in a square lattice-like on a surface of the glass substrate 16. The pixels 20 are arranged, for example, in a matrix in a rectangular image region (active region) with one side length of 13 inches. The respective pixels 20 include a thin film transistor 22 and a photodiode 21. A control line extends between the respective pixels 20 along a row in a square lattice having the pixels 20 arranged on the surface of the glass substrate 16. Furthermore, the same number of data lines 19 extends between the respective pixels 20 along a column in the square lattice having the pixels 20 arranged on the surface of the glass substrate 16. The scintillator layer 13 is formed on the surface of the region having the pixels 20 arranged on the array substrate 12.

The scintillator later 13 is provided on the surface of the array substrate 12, and when the X-ray is incident, the fluorescence in a visible light region is generated. The generated fluorescence reaches the surface of the array substrate 12.

The scintillator layer 13 is formed to be in a columnar structure by vacuum deposition of, for example, cesium iodide (CsI):thallium (Tl), or sodium iodide (NaI):thallium (Tl) or the like. For example, a deposited film of CsI:Tl is used for the scintillator layer 13, and the film thickness is about 600 μm. A size of the column (pillar) of the columnar structure of CsI:Tl is, for example, approximately 8 to 12 μm at the outermost surface. Alternatively, oxysulfide gadolinium ($Gd_2O_2S$) fluorescence material particle is blended with a binder material, is applied on the array substrate 12, fired and cured, and a groove is formed in a square columnar shape by dicing with a dicer, and then the scintillator layer 13 may be formed. A space between the pillars is enclosed with the atmosphere or inert gas such as nitrogen ($N_2$) for oxidation prevention is enclosed, alternatively may be in a vacuum state.

The array substrate 12 receives the fluorescence generated in the scintillator layer 13 and generates the electrical signal. As a result, a visible light image generated in the scintillator layer 13 by incident X-ray is converted to the image information expressed by the electric signal.

The radiation detector 11 is supported by the support plate 31 so that the support plate 13 contacts an opposite surface to a surface where the scintillator layer 13 is formed. The circuit board 30 is disposed on an opposite side to the radiation detector 11 of the support plate 31. The radiation detector 11 is electrically connected to the circuit board 30 by the flexible substrate 32.

The respective photodiodes 21 are connected to the control lines 18 and the data lines 19 via the thin film transistor serving as a switching element. The respective photodiodes 21 are connected in parallel to a storage capacitor 27 disposed opposed to a lower portion and formed in a rectangular flat shape. The storage capacitor 27 may double as a capacitance of the photodiode 21, and is not always needed.

The photodiode 27 and the storage capacitor 27 connected in parallel to it are connected to a drain electrode 25 of the thin film transistor 22. A gate electrode 23 of the thin film transistor 22 is connected to the control line 18. A source electrode 24 of the thin film transistor 22 is connected to the data line 19.

The gate electrode 23 of the thin film transistor 22 of the pixel 20 located at the same row of the arrangement is connected to the same control line 18. The source electrode 24 of the thin film transistor 22 of the pixel 20 located at the same column of the arrangement is connected to the same data line 19.

The gate electrode 23 of the thin film transistor 22 in the pixel 20 on the same row is connected to the same control line 18. The source electrode 24 of the thin film transistor 22 in the pixel 20 on the same column is connected to the same data line 19.

The respective thin film transistors 22 play a switching function storing and releasing charges generated by fluorescence incidence to the photodiode 21. At least a portion of the thin film transistor 22 is formed of a semiconductor material such as amorphous silicon (a-Si) of noncrystalline semiconductor which is a crystalline semiconductor material, or polysilicon (P-Si) of crystalline semiconductor.

In FIG. 1 and FIG. 2, the pixels are just only described by 5 rows 5 columns or 4 rows 4 columns, however in reality, necessary pixels are formed much more depending on the resolution and the imaged area.

The radiation detector 10 includes a radiation detector 11, a gate driver 39, a row selection circuit 35, an integrating amplifier 33, an A/D converter 34, a serial/parallel converter 38, and an image composing circuit 36. The gate driver 39 is connected to the respective control lines 18 of the radiation detector 11. The gate driver 39 controls an operation condition of the respective thin film transistors 22, namely, turning on and off. The gate driver 39 is mounted, for example, on a side edge along a row direction on the surface of the array substrate 12. The integrating amplifier 33 is connected to the respective data lines 19 of the radiation detector 11.

The row selection circuit 35 is connected to the gate driver 39. The serial/parallel converter 38 is connected to the integrating amplifier 38. The A/D converter 34 is connected to the serial/parallel converter 38. The A/D converter 34 is connected to the image compositing circuit 36.

The integrating amplifier 33 is provided, for example, on the flexible substrate 32 connecting the radiation detector 11 and the circuit board 30. Other elements are provided, for example, on the circuit board 30.

The gate driver 39 receives signals from the row selection circuit 35 and controls the operation state of the respective thin film transistors 22, namely, turn on and off. That is, voltages of the control line 18 are changed sequentially. The row selection circuit 35 sends signals for selecting a prescribed row scanning the X-ray image to the gate driver 39. The integrating circuit 33 amplifies an extremely slight charge signal outputted through the data line 19 and outputs.

The detecting elements such as the photodiode 21 and the thin film transistor 22 and the insulative protection film covering metal wirings such as the control line 18 and the data line 19 are formed on the surface of the arrayed substrate 12. The scintillator layer 13 is formed on the surface of the protection film so as to cover a region where the pixels 20 are arranged.

Bonding pads 29 are arranged on the array substrate 12, respective ends of the control line 18 and the data line 19 are exposed, and a terminal group 26 is formed. The terminal group 26 is arranged along a side of the array substrate 12. The terminal group 26 connecting to the control line 18 and the terminal group 26 connecting to the data line 19 are arranged along different sides. These terminal groups 26 are electrically connected to the circuit board 30 via the flexible substrate 32.

FIG. 7 is an enlarged cross-sectional view in the vicinity of the radiation detector according to the embodiment.

A surface of the scintillator layer 13 is covered with the smoothed surface 14 having a resin material as one component. The smoothed surface 14 is formed to contact the surface of the scintillator layer 13. The surface of the smoothed surface 14 is covered with the moisture-proof layer 15. The moisture-proof layer 15 is formed to contact the surface of the surface-smoothing layer 14. The surface-smoothing layer 14 may have a role of the reflection film reflecting fluorescence vanishing from the array substrate 12 of the fluorescence generated in the scintillator layer 13 to reflect to the array substrate 12 side. An outer periphery 51 of the moisture-proof layer 15 contacts directly the surface of the array substrate 12.

An organic resin material is dissolved by the solvent and changed to coating liquid, the liquid is mixed with a light scattering particles of ceramics (for example, $TiO_2$ etc.) or metal particles to be scattered, and then is coated by a method of applying, printing or spray or the like on the scintillator layer 13 and thereafter is dried, and thereby the surface-smoothing layer 14 is formed. The moisture-proof layer 15 is formed by stacking a metal film, an oxide film, a nitride film or oxynitride film of metal and semiconductor, or a composite film of these films on the smoothed layer by a physical or chemical vapor film growth method (PVD method or CVD method).

FIG. 8 is an enlarged cross-sectional view in the vicinity of the radiation detector according to a variation of the embodiment.

In this variation, an outer periphery 52 of the smoothed layer 15 contacts the surface of the array substrate 12 with a certain degree of width.

An important characteristic required for the protection film of the scintillator layer 13 is moisture-proof property. Particularly, in the deliquescent scintillator layer 13 such as CsI:Tl film often used for the X-ray detector 10, the moisture-proof property is a lifeline of reliability of the detector. In order to ensure the moisture-proof performance, it is necessary to use a substance with high water vapor barrier performance as a physical property of the material itself.

Generally, organic resin material has low water vapor barrier property in a point of physical property of the material itself. The reason is considered to be that water molecule passes through easily because of original gap between molecular chain due to polymer molecule and gap due to thermal motion. Although there is a difference of degree depending on a type of resin, water vapor barrier performance is generally low and organic resin material is not adequate for using as the moisture-proof layer of CsI:Tl layer.

On the other hand, an inorganic material such as metal and ceramics has relatively high water vapor barrier performance in a point of physical property of the material itself. The reason is considered to be that different from the polymer resin material, the inorganic substance of metal and ceramics has structures formed between metal atoms and between a metal atom and an atom such as oxygen, nitrogen, and carbon, and a gap through which water molecule (water vapor) pass does not almost exist in the bulk. Therefore, when the scintillator protection film is formed of the inorganic substance, excellent moisture-proof performance can be expected.

For example, the moisture-proof layer based on Al foil material or the like utilizes the high gas barrier performance of the inorganic material. However, in such a case, it is necessary to bond and seal the moisture-proof layer and the substrate in the periphery of the scintillator, and the area dimension necessary for bonding and sealing leads increase of the outside dimension of the product itself.

Then, it is desired that the moisture-proof layer of the inorganic material having high water vapor barrier property is formed to cover the scintillator film directly. The important point at this time is that the formed inorganic film is necessary to be a film having little defect.

However, the scintillator film of as CsI:Tl or the like has generally a pillar structure and the film surface has a large unevenness. Also in the case of other firing scintillator material such as $Gd_2O_2S:Tb$ or the like, unevenness may be formed on the surface. Therefore, even if the protection film of the inorganic substance id formed directly on these scintillator layers 13, the film having many defects is formed due to the unevenness on the gap and surface of the base scintillator material. It is difficult to form a continuous film of CsI:Tl or the like directly on the scintillator layer due to the columnar (pillar) structure.

However, in the embodiment, the surface-smoothing layer 14 which is easy to be formed to be continuous and smooth and having one main component of the organic resin substance is formed directly on the scintillator layer 13, and based on the smoothness, the moisture-proof layer 15 having high water vapor barrier property, made of the inorganic substance and having little defect is formed on the surface-smoothing layer 14. This composite film allows the moisture-proof layer having excellent moisture-proof performance to form if the minimum area for bonding and sealing is ensured in the periphery of the scintillator layer.

According to the embodiment, the radiation detector can be provided, which suppresses the increase of the size of the array substrate 12 caused by the moisture-proof structure and has small characteristic degradation and excellent high temperature and high humidity resistance even in the scintillator film such as CsI:Tl film which characteristics of sensitivity and resolution are sensitive to the humidity.

The respective film thickness necessary for the moisture-proof layers is determined from a view point of not generating a film defect as described in the previous description to be important. The surface-smoothing layer 14 having the organic resin as a main raw material is necessary to be formed to smooth the unevenness of the surface of the scintillator layer 13 and to cause the inorganic moisture-proof layer 15 formed on an upper portion of the scintillator layer to be the continuous film. To that end, while there are some differences in thicknesses depending on viscosity because of the coated film having the organic resin as the main component, the film thickness generally substantially not less than the unevenness of the scintillator layer 13 serving as the base of the surface-smoothing layer 14 is ensured, and thereby the purpose is realized. The moisture-proof layer 15 of the inorganic material is necessary to be the continuous film sufficiently covering the surface unevenness of the smoothed layer serving as the base. To that end, while there are some differences in film formation methods of the inorganic material film (sputtering, vacuum deposition, or plasma CVD or the like), the film thickness generally substantially not less than the surface unevenness of the smoothed layer of the base is ensured, and thereby the purpose is realized.

The moisture-proof layer like this may be formed by stacking the surface-smoothing layer 14 and the moisture-proof layer 15 alternately in several times. When the surface-smoothing layer 14 and the moisture-proof layer 15 are stacked in several times, even if defects causing the water vapor to pass exist in the moisture-proof layer 15, probability of the defect positions overlapping between multiple layers is extremely low, and thus securer moisture-proof performance can be obtained.

FIG. 9 is an enlarged cross-sectional view in the vicinity of the radiation detector according to one other variation of the embodiment.

In the variation, the outer periphery 52 of the surface-smoothing layer 14 and the outer periphery 51 of the moisture-proof layer 15 cover a portion of the surface of the flexible substrate 53 connected to a bonding pad 29 for external connection formed on the surface of the array substrate 12.

In the moisture-proof structure of the embodiment, in order to adhere and seal the substrate to the protection film, namely, the surface-smoothing layer 14 and the moisture-proof layer 15 at the periphery of the scintillator layer 13, a small width (for example, approximately 5 mm) is sufficient. However, when forming the surface-smoothing layer 14 having the organic resin as the main component by a dispenser method, a screen print method, or a spray method or the like, it should be avoided that the peripheral bonding pad 29 is covered and a portion of the material of the surface-smoothing layer 14 is attached. Also when forming the inorganic moisture-proof layer 15 by sputtering and the vacuum deposition method or the like, it should be avoided that the peripheral bonding pad 29 is covered and a portion of the material of the water barrier layer 15 is attached.

In order to surely avoid attachment of these film materials to the bonding pad 29 of the array substrate 12, it is necessary to fabricate and use a mask with excellent dimension accuracy and workability. For masking, it is desired to provide some a quantity of gap between the bonding pad 29 and the scintillator 13. The gap leads to over increase of the substrate dimension.

However, in the variation, the wiring such as the flexible substrate 53 leading to an external circuit is previously connected to the bonding pad 29 before forming the moisture-proof layer. As a result, the surface-smoothing layer 14 and the water barrier layer serving as the moisture-proof layer cover a portion of the surface of the bonding pad 29, however no particular problem does not occur. Furthermore, the severe dimension accuracy is not necessary for a mask when forming the protection film. Moreover, it is also possible to cause the bonding pad 29 to close to the scintillator layer 13 to the last minute, and the over panel dimension is omitted and the compact radiation detector 11 with the minimum dimension can be provided.

Figure 10:
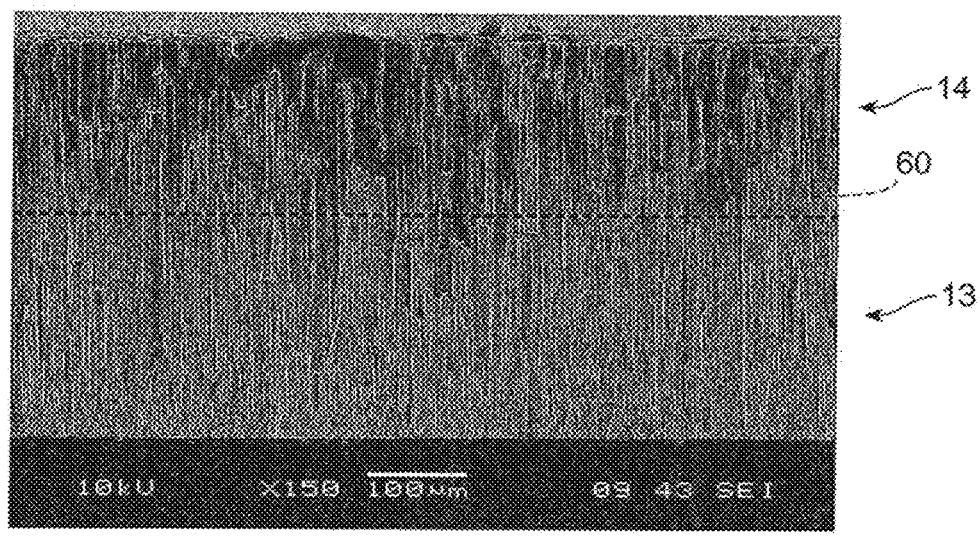
FIG. 10 is a photograph showing penetration of a polyparaxylylene CVD moisture-proof layer into a CsI:Tl film pillar structure.

FIG. 10 is a photograph showing penetration of a polyparaxylylene CVD moisture-proof layer into a CsI:Tl film pillar structure.

In the case where the surface-smoothing layer 14 directly formed (in the case of stacking in plurality, first) on the scintillator layer 13 is formed of only a resin component, for example, the resin component may penetrate to a position 60 below the surface of the scintillator layer 13 in the pillar structure gap such as CsI:Tl film scintillator film. When the resin penetrates, the gaps between the pillars are filled and the light guide effect by the pillar structure is reduced. As a result, the resolution characteristics of the scintillator film are reduced.

Then, a ceramics fine particle with a generally high refractive index in comparison with a resin material may be added to the surface-smoothing layer 14 directly formed (in the case of stacking in plurality, first) on the scintillator layer 13 as the light scattering particles of scintillator light. For example, the cross talk of the scintillator light between the pillars generated by filling between the pillars of the CsI:Tl film by the resin of the surface-smoothing layer 14 can be suppressed by the light scattering particles effect. As a result, the radiation detector with an excellent resolution characteristics and the small resolution reduction of side effect accompanying with penetration of the resin of the surface-smoothing layer 14 into the scintillator layer 13 can be provided.

The refractive index of the organic resin in the visible light region is generally in the vicinity of 1.4 to 1.5, and a refractive index of ceramics such as oxide and nitride in the same region is larger than the refractive index of the resin. Particularly, in the case where the fine particle of titanium oxide ($TiO_2$:rutile type, n=approximately 2.8) which is a high refractive index material is added, scattering performance of the scintillator light is extremely high, and the effect of suppressing the resolution reduction is particularly large.

When a particle diameter of added ceramics particle is in the vicinity of an approximately ½ of a wavelength of the scintillator light, it is called as Mie scattering region, the scattering is most easily occurred. That is, the suppression effect of the cross talk in the pillar of the scintillator is large. The light scattering becomes hard to occur when the particle diameter is small by generally one order or more with respect to the wavelength of the scintillator and the effect becomes small. When the particle diameter of the ceramics is large with respect to the wavelength of the scintillator light, the scattering due to geometric optical refraction can be expected, however because a number density of the ceramics fine particle which can be added to the smoothed layer decreases with increasing particle diameter, the scattering performance per unit volume is inevitably reduced. From these, the ceramics fine particle having an average particle diameter of generally approximate ¹/₁₀ to 10 times of the scintillator light is adequate to the light scattering particles.

When the additive amount of ceramics fine particles to the resin component extremely increases, necessary smoothness of the surface of the surface-smoothing layer 14 is damaged, and thus an upper limit of a volume fraction is generally approximately 60 vol. %. On the other hand, when the additive amount is extremely small, the scattering effect of the scintillator light is small, and thus the volume fraction is desirable to be generally approximately not less than 20 vol. %.

The surface-smoothing layer 14 including the ceramics fine particles formed on the scintillator layer 13 plays a role of suppressing the cross talk between the scintillator and the pillar, and in addition covers the whole scintillator to play a role of the reflection layer.

The surface-smoothing layer 14 contains at least an organic resin as the main component. When the organic resin is dissolved in solvent to be once in a state of coating liquid and the coating liquid is applied on the scintillator layer, the unevenness of the scintillator surface is filled with the coating liquid and an outermost surface of the coating liquid is leveled (smoothed) by a gravity effect. Therefore, the outermost surface is changed to a film in a smoothed state, and thus a surface state necessary for the surface-smoothing layer 14 can be obtained.

The solvent for changing to coating liquid is naturally to easily dissolve the resin depending on the type of the resin, and furthermore is desirable to have an adequate drying rate. A boiling point of the solvent is also important as a standard. By using the solvent having a boiling point of not less than generally 100° C., quick drying after applying can be avoided and sufficient time for exerting the leveling effect to relax the unevenness can be ensured. As a result, it becomes possible to obtain the suitable outermost surface as the surface-smoothing layer 14.

A physical vapor film formation method (PVD method) such as a sputtering method and a vacuum deposition method, and a chemical vapor film formation method such as a PECVD method are desirable for a method for manufacturing the moisture-proof layer 15 formed on the surface-smoothing layer 14. This is because of that these methods are favorable for obtaining a dense film having a characteristic necessary for the moisture-proof layer 15 and ensuring reliability of adhering strength to the surface-smoothing layer 14. According to film formation from a vapor phase, in comparison with a wet film formation method, containing an impurity is suppressed as much as possible and a void, a pin hole and a crack or the like are extremely hard to occur. Furthermore, cleaning of the film surface such as sputter etching before the film formation can be made in the same film formation apparatus just before the film formation, and then these methods are desirable also for improving the reliability of the adhesion strength of the organic resin to the surface-smoothing layer 14.

Furthermore, it has been confirmed that the following points are important and effective in order to obtain the surface-smoothing layer 14 which is excellent in smoothness and includes the organic resin, and the moisture-proof layer 15 which has no pinhole, excellent film quality being dense, and includes the inorganic material.

At first, the surface-smoothing layer 14 is formed on the scintillator layer 13. Next, the moisture-proof layer 15 including the inorganic material is formed on the surface-smoothing layer 14 by using the PVD method or the CVD method. A that time, before the film formation of the moisture-proof layer 15, the surface-smoothing layer 14 is heated for a definite time in the chamber. If outgassing from the surface-smoothing layer 14 is prompted by this heating, the outgassing from the surface-smoothing layer 14 is suppressed in the later formation of the moisture-proof layer 15. This effect allows the film quality of the moisture-proof layer 15 to be excellent.

The heating temperature is necessary to be determined by considering a type of the organic resin included in the surface-smoothing layer 14 and a heat resistance temperature of the scintillator layer 13. In this case, the scintillator layer 13 is made of a CsI:Tl deposition film or a sintered material of $Gd_2O_2S$:Tb, and the heat resistance temperature is far higher than that of the organic resin. Therefore, determination may be made by considering the heat resistance temperature of the organic resin used for the surface-smoothing layer 14.

In the case where the organic resin is a thermosetting resin, an upper limit of the heating temperature is set by taking a range in which degradation of the film due to extreme hardening does not proceed as a standard. In the case where the organic resin is a thermoplastic resin, the upper limit of the heating temperature is set by taking a softening point as a standard.

In the case where the thermoplastic resin is used as the material of the surface-smoothing layer 14, if the heating is performed to neighborhood of the softening point of the thermoplastic resin, fine unevenness on the surface of the surface-smoothing layer 14 is reduced, and the effect of improving more the smoothness of the surface can be obtained additionally.

The heating time is preferred to be generally long in order to proceed the outgassing from the surface-smoothing layer 14 as much as possible. In practice, change of the amount of the outgassing due to the heating temperature and the heating time is preliminarily determined, and the heating time can be set from the outgassing characteristics. It is desirable to set the heating time in which the amount of the outgassing decreases with time and decreases to the equivalent level to other amounts of outgassing in the chamber.

After the heating (degassing) of the surface-smoothing layer 14, it is desirable to reduce the temperature of the surface-smoothing layer 14 and to form the moisture-proof layer 15 including the inorganic material by the PVD method (sputtering method, deposition method) or the CVD method (plasma CVD method, thermal CVD method).

The reason why the temperature of the surface-smoothing layer 14 (the scintillator layer 13 and the array substrate 12 having generally the same temperature) is decreased is to suppress outgassing rate from the degassed surface-smoothing layer 14 more. A state in which the outgassing from the surface of the surface-smoothing layer 14 is further small can be obtained by decreasing the temperature after the degassing. As a result, the moisture-proof layer 15 which has little defect such as a pin hole, high density and high quality is easily formed.

However, If the temperature of the surface-smoothing layer 14 is too decreased, the film quality (density and little defect) of the moisture-proof layer 15 formed on the surface of the surface-smoothing layer 14 and including the inorganic material may be lowered conversely. The reason is that if the temperature of the surface-smoothing layer 14 is too low, kinetic energy of atoms and molecules of the inorganic material and clusters arriving at the surface-smoothing layer 14 is easy to decay, and a range of movement on the surface of the surface-smoothing layer 14 is suppressed. The decrease of the range of movement on the surface of the surface-smoothing layer 14 leads to increase of film defects.

Therefore, it is desirable to optimize a degree of the temperature decrease and form the water vaper barrier layer 15 by previous confirmation with relation to the temperature of degassing in the heating the surface-smoothing layer 14.

A high temperature and high humidity test is performed in order to evaluate characteristics of the radiation detector 11 according to the embodiment.

FIG. 11 is a table showing results of a high temperature and high humidity test of the radiation detector according to the embodiment.

In the radiation detector 11 of an end product, the scintillator layer 13, the surface-smoothing layer 14 and the moisture-proof layer 15 are sequentially formed on the array substrate 12, however in the high temperature and high humidity test, the scintillator layer 13 is formed directly on the glass substrate, and the surface-smoothing layer 14 and the moisture-proof layer 15 are stacked thereon. In the high temperature and high humidity test, the luminance and the resolution (CTF) characteristics are measured. For the luminance and the resolution characteristics, a method of applying the X-ray from the moisture-proof layer 15 side, focusing on an interface between the glass substrate and the scintillator layer 13 from a back face of the glass substrate, and imaging the X-ray image by a CCD camera has been used. The luminance is a relative luminance to an intensifying screen (Fuji film Kabushiki Kaisha HG-H2 Back) serving as a standard, and the resolution has been determined from image processing of a value=CTF (2 Lp/mm) % of CTF (Contrast Transfer Function) of 2 Lp/mm of the resolution chart.

A test sample has been manufactured as described below. The scintillator layer 13 is formed by forming a square-shaped CsI:Tl film (600 μmt) with one side of 25 mm on the square-shaped glass substrate with one side of 40 mm. Next, the surface-smoothing layer 14 is formed on the scintillator layer 13. The material of the surface-smoothing layer 14 is the coating liquid, a butyral-based resin and an epoxidation linseed oil as a plasticizer are mixed by 50 wt. %, respectively, are changed to a coating liquid by using cyclohexane as the solvent, and the coating liquid is applied on the scintillator layer 13. An applying method is capable of including a method of sequentially applying by a dispenser while scanning the glass substrate on an XY stage, a method of applying by a role coater using a simple screen, and a method of brush coating. A method of applying using a spray gun in a state of thinning a concentration of the coating liquid is also possible depending on a type of the scintillator layer 13. The surface-smoothing layer 14 is formed in a state of covering the whole of the CsI:Tl scintillator layer 13 and adhering the glass substrate in a periphery of the scintillator layer 13. An adhesion region to the substrate is generally approximate 1 mm.

Other than the method of causing the surface-smoothing layer 14 to adhere to the glass substrate 16 directly, the moisture-proof performance can also be ensured by a method in which a dam-shaped frame is preliminarily formed of a resin, metal or glass or the like on the periphery of the scintillator layer 13 of the glass substrate 16, and the surface-smoothing layer 14 is caused to adhere to the frame. However, it is necessary to adhere and seal the respective frames and the glass substrate 16 in order to prevent the penetration of water vapor.

The film thickness necessary for forming a continuous film as the surface-smoothing layer 14 is different depending on the degree of unevenness of the scintillator layer 13 of the foundation. In the case of forming on the CsI:Tl scintillator layer 13 with a thickness of 600 μm, the surface-smoothing layer 14 with sufficiently excellent flatness has been obtained with generally approximate 100 μm as a film thickness at drying. The film thickness is not limited to this, it is only necessary to ensure the sufficient flatness by which the unevenness of the surface of the scintillator layer 13 of the foundation is covered as the continuous film and the inorganic moisture-proof layer 15 formed in the later process is formed as the continuous film. In the case of forming on the CsI:Tl film of the pillar structure, continuity of the surface-smoothing layer 14 and the flatness of the surface can be ensured by a film thickness of generally 10 μm or more.

In the case where the film thickness of the surface-smoothing layer 14 is too thick, a film stress at drying (a stress to remove the scintillator film strengthens) and a long time required for drying may produce problems. Furthermore, the extreme increase of film thickness of the surface-smoothing layer 14 is not desirable in a point of a region of the scintillator layer 13 contacting the array substrate 12 in the periphery being easily broad, and in a point of a downsizing effect of the outside dimension being faded. From these viewpoints, generally approximate 300 μm is desirable to be the upper limit of the thickness.

As other example of the surface-smoothing layer 14, a sample intended to double as the reflection layer by mixing powder of $TiO_2$ (rutile) having an average diameter of approximately 0.3 μm with the resin material changed to coating liquid has also been manufactured. A mixing ratio is set to resin:$TiO_2$=1:9 by a weight ratio. Although a content ratio of $TiO_2$ is significantly high, this is for maintaining high resolution characteristics as the reflection film to be high. If the light scattering particles including $TiO_2$ or the like penetrates between the pillars of the scintillator, improvement of suppression effect of cross talk between the pillars can be expected. If the content ratio of $TiO_2$ exceeds this ratio, the flatness of the outermost surface of the surface-smoothing layer 14 is hard to ensure, and the upper limit of the content of $TiO_2$ is desirable to be substantially near the above ratio.

As a result of SEM observation of the state of cross-section after the smoothed layer mixed with $TiO_2$ fine particles is applied/dried onto a 600 μmt CsI:Tl film, it has been confirmed that the $TiO_2$ fine particles with the resin component penetrate into gaps of the pillar structure of the CsI:Tl film. In this case, an effect of suppressing cross talk of scintillator light between the pillars is expected.

When the smoothed layer doubling as the reflection film is formed by causing the binder resin to contain the light scattering particles including $TiO_2$ or the like with a high filling rate, the case easily occurs, where the outermost surface is not smoothed well (film surface with many porous unevenness is obtained) depending on the particle diameter and the content ratio of the light scattering particles or the type and viscosity of the binder resin and the solvent. In that case, a good excellent smooth surface can be obtained by forming the coating liquid for the smoothed layer with a composition of no light scattering particles or less content ratio, and over-coating on a film including the high content light scattering particles.

The smoothed layer containing the light scattering particles with a high filling rate in order to suppress diffusion of light in the film to a distance is desirable to have a volume ratio (volume of light scattering particles/volume of binder resin) generally not less than 1.0.

On the other hand, the smoothed layer stacked on the smoothed layer containing the light scattering particles with the high filling rate and containing the light scattering particles with a low filling rate or not containing is desirable to have a volume ratio (volume of light scattering particles/ volume of binder resin) generally less than 1.0.

Next, the moisture-proof layer 15 is formed on the surface-smoothing layer 14. It is necessary to select a material which does not easily inhibit transmission of X-ray and has high water vapor barrier performance.

FIG is a table showing an example of a film formation condition of a moisture-proof layer according to the embodiment.

The water barrier layer 15 can be formed into a film by EB (Electron Beam) vacuum evaporation method, RF (radio frequency) sputtering method, PE (plasma enhanced) CVD method or the like under the condition shown in FIG. 12. An introduction pressure, an input power or the like have been appropriately tuned with reference to a film formation rate and film quality based on the condition shown in FIG. 12.

When the water vaper barrier layer 15 is formed into a film, masking is made in order not to occur film attachment to the outside of a film formation region. The heat resistance temperature of the resin of the surface-smoothing layer 14 serving as the foundation is taken into consideration, and the film formation has been performed under the condition capable of setting the substrate temperature to be not more than 150° C.

As other example, a protection layer having the surface-smoothing layer 14 alternately stacked with the moisture-proof layer 15 in multiple times has been discussed. Quality of material and a film thickness are the same as the case of stacking one layer by one layer, and trial production has been made for the case of alternately stacking two layers, respectively and the case of alternately stacking three layers, respectively.

As a comparative example, the trial production has been made for the case of forming polyparaxylylene CVD film (film thickness 20 μm) as a prevention layer on the CsI:Tl film and for a structure of bonding and sealing an aluminum moisture-proof layer having a hat-shaped brim to a substrate around the scintillator. In the former comparative example, a dimer of paraxylylene is used as a raw material, heated and vaporized to be transferred to a film formation chamber, and a film of polyparaxylylene is formed on the substrate including the scintillator film. In the latter comparative example, a reflection film formed of $TiO_2$ fine particles and the binder resin is previously formed on the CsI:Tl film, and furthermore the brim of AL hat is bonded and sealed by a highly airtight binder. A brim width of the AL hat is 5 mm.

When a photoelectric conversion element substrate applied to the practical radiation detector 11 is designed, an area is needed to be included, for sealing the moisture-proof layer and the substrate by the bonding layer outside the area where the scintillator layer 13 is formed. In this example, a margin of the AL hat brim width and flash of the bonding agent is approximately 8 mm on one side, and 16 mm on both sides, in comparison with the necessary area in the embodiment (in the working example, 1 mm on one side and 2 mm on both sides), the substrate size will increase by approximately 14 mm both in the back and forth direction and the horizontal direction.

The sample according to the embodiment produced in this way and the sample of the comparative example have been subjected to the high temperature and high humidity test of 60° C.-90% RH, and the change of the luminance and the resolution (maintenance factor) have been traced.

Figure 13:
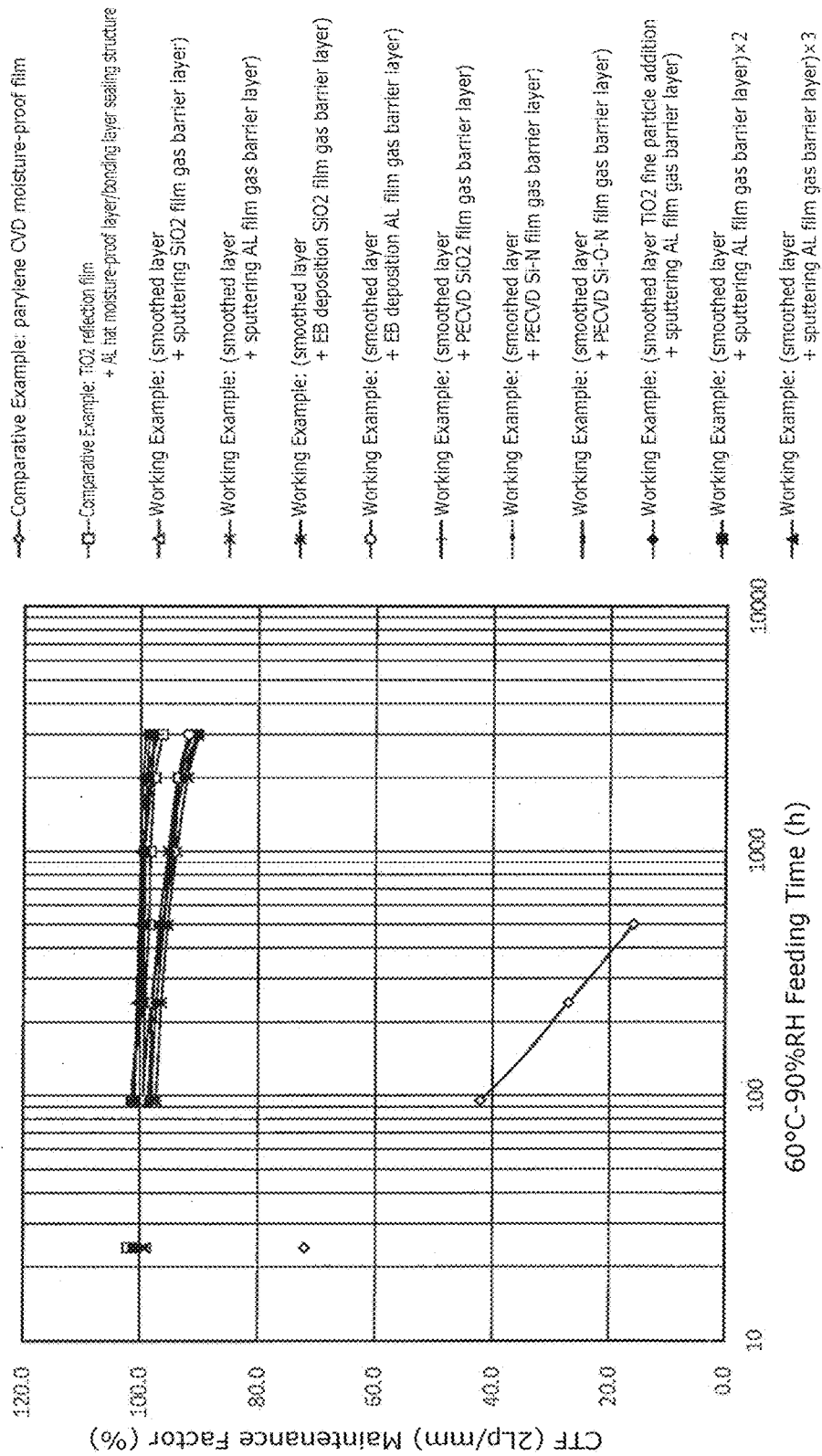
FIG. 13 is a graph showing a time change of CTF maintenance factor in the high temperature and high humidity test of the radiation detector according to the embodiment.
Figure 14:
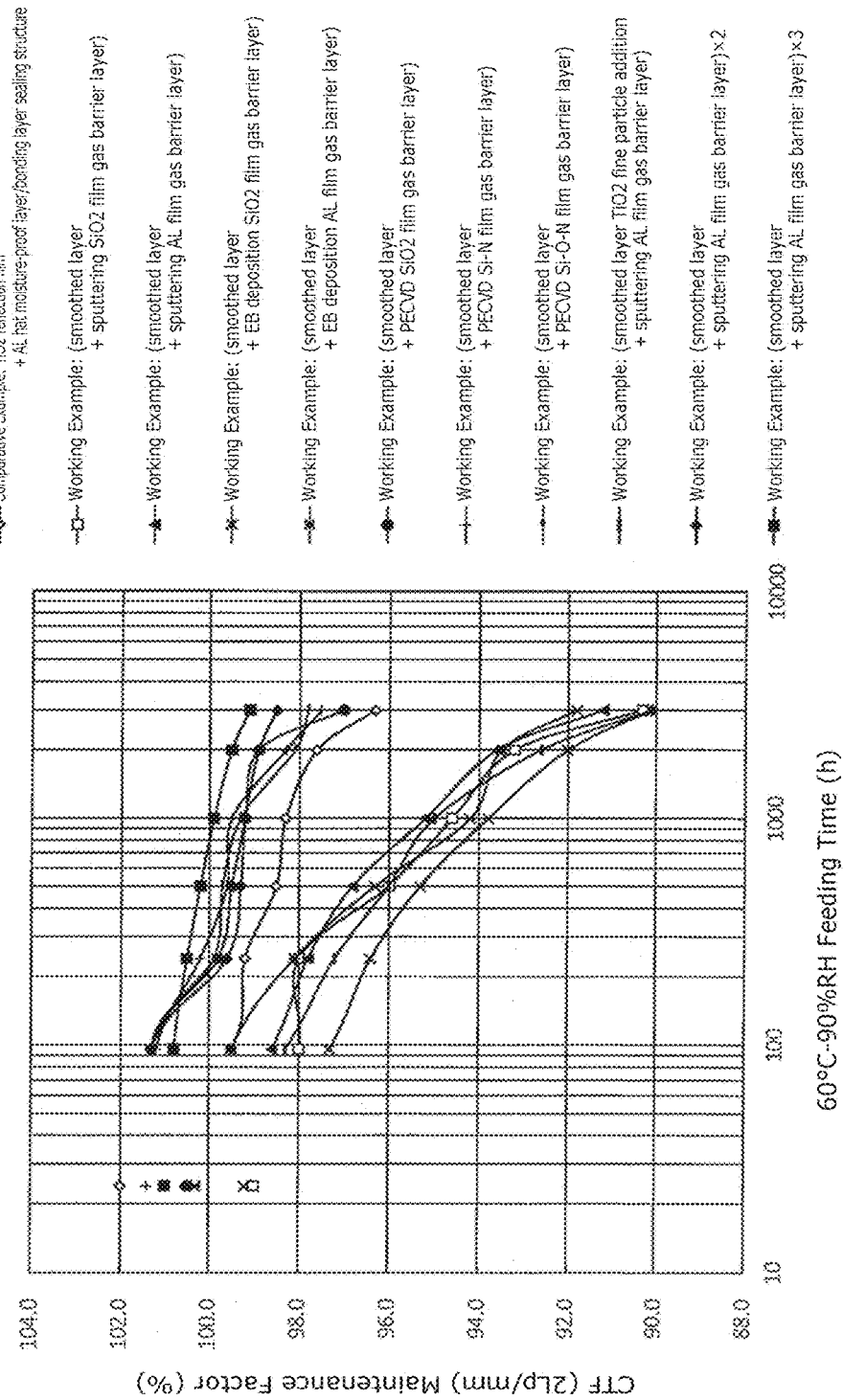
FIG. 14 is a graph enlarging a vertical axis in FIG. 13.

FIG. 13 is a graph showing a time change of CTF maintenance factor in the high temperature and high humidity test of the radiation detector according to the embodiment. FIG. 14 is a graph enlarging a vertical axis in FIG. 13.

Because the characteristics degradation of the CsI:Tl film due to moisture is likely to appear remarkably in the resolution, the characteristics maintenance factor of CTF (2 Lp/mm) which is the index of the resolution has been examined. The value of CTF (2 Lp/mm) of the sample based on the polyparaxylylene CVD film decreased to in the vicinity of ⅔ of the initial value. On the contrary, the values of CTF (2 Lp/mm) of the sample according to the embodiment and the sample based on the moisture-proof layer of the AL hat do not almost change from the initial value even if 500 hours elapse. It is found that the protection films having a large number of stacking the surface-smoothing layer 14 and the moisture-proof layer 15 in the protection films of the embodiment have higher moisture-proof performance.

Figure 15:
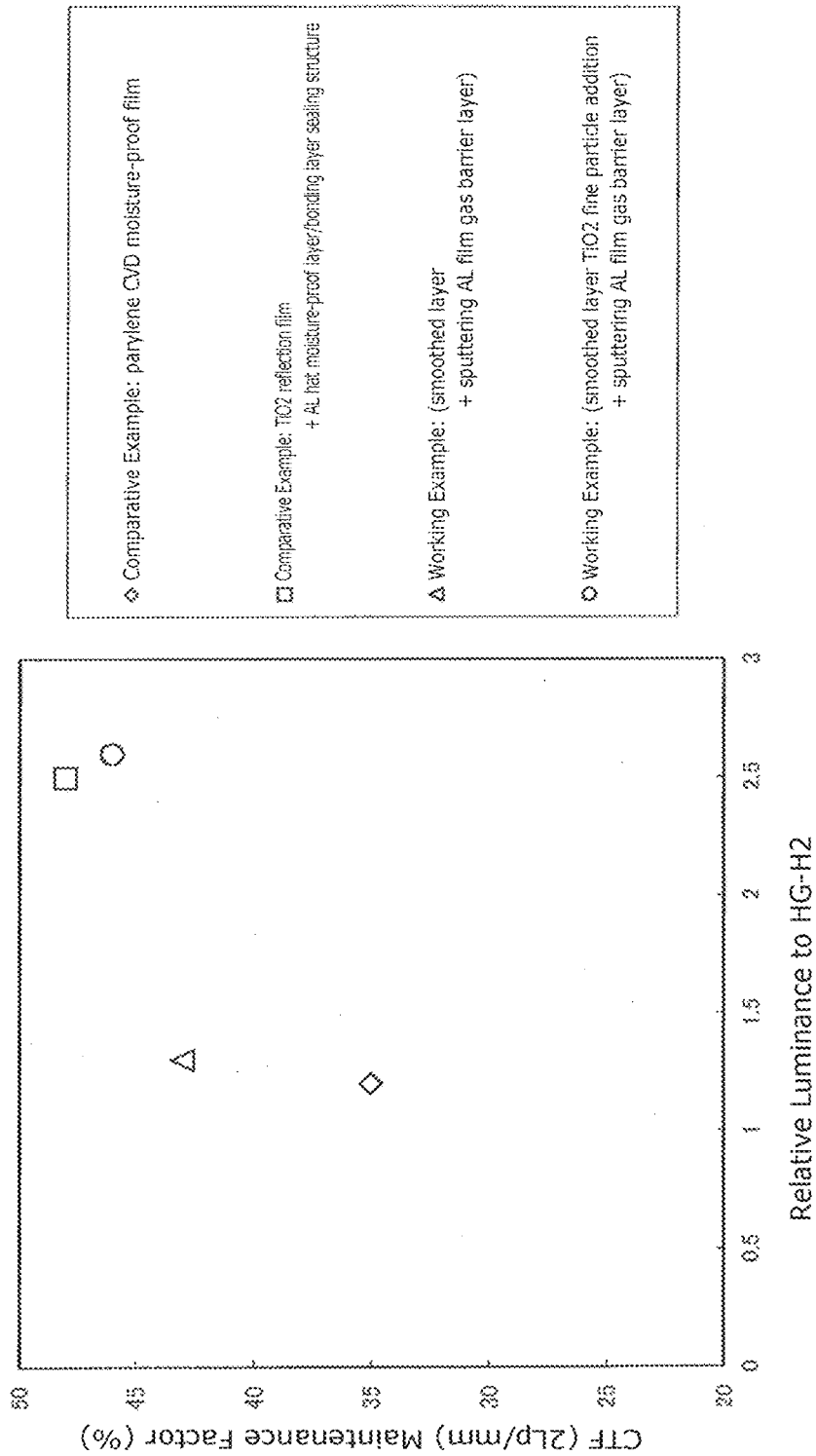
FIG. 15 is a graph showing a relationship between an initial luminance and the CTF maintenance factor in the high temperature and high humidity test of the radiation detector according to the embodiment.

FIG. 15 is a graph showing a relationship between an initial luminance and the CTF maintenance factor in the high temperature and high humidity test of the radiation detector according to the embodiment.

When a reflection film performance is given by mixing the surface-smoothing layer 14 formed on the CsI:Tl film scintillator layer 13 with $TiO_2$ fine particle powder, the characteristics of high luminance and high resolution are obtained similar to the structure of the $TiO_2$ reflection film and the AL hat moisture-proof layer/bonding layer. On the other hand, in the comparative example based on the polyparaxylylene CVD film as the moisture-proof layer and the sample of the embodiment that the ceramic fine particle powder is not added to the surface-smoothing layer 14 formed on the scintillator layer 13, the luminance and the resolution tend to be low. With respect to the luminance, the function of the reflection film is not formed, and thus the low luminance is considered to be due to loss of fluorescence emitted in an opposite direction to the substrate side.

With respect to the resolution decrease, it is considered that the resin material penetrates into the pillar structure of the CsI:Tl film and a light guide effect is reduced, the cross talk of the light occurs between the pillars and the resolution decrease is led. Particularly, in the case of the moisture-proof layer of the polyparaxylylene CVD film, polyparaxylylene penetrates deeply as shown in FIG. 10. This is considered to be caused by deep penetration of monomer molecule due to vapor film formation.

On the other hand, when the formation is made on the scintillator layer in the state of coating liquid, the penetration depth into the pillars of the CsI:Tl film can be controlled by viscosity. In the vase where the viscosity of the coating liquid of the surface-smoothing layer 14 is set to approximately 1200 mPa·sec by an addition amount of cyclohexane of the solvent and film-coating is made, the penetration depth of the CsI:Tl scintillator film 13 from a surface layer is suppressed to be approximately 50 μm or less.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A radiation detector comprising:
    an array substrate comprising a photoelectric conversion element;
    a scintillator layer formed on the photoelectric conversion element and converting radiation to fluorescence; and
    a composite layer comprising a surface-smoothing layer and a moisture-proof layer, the surface-smoothing layer being a continuous film formed to cover the scintillator layer and comprising an organic resin material and, dispersed therein, light scattering particles, the moisture-proof layer being a continuous film formed on a surface of the surface-smoothing layer by direct film formation and consisting of inorganic material,
    wherein the surface-smoothing layer has:
    a higher volume fraction of the light scattering particles on a side nearer to the scintillator layer and a lower volume fraction of the light scattering particles on a side nearer to the moisture-proof layer, and
    a thickness that is not less than an unevenness of the scintillator layer.

2. The radiation detector according to claim 1, wherein the composite layer comprises an alternating stack of plural surface-smoothing layers and plural moisture-proof layers.

3. The radiation detector according to claim 1, further comprising: wirings from external circuits and connected to bonding pads of lead-wirings on the array substrate in a periphery of a region where the scintillator layer is formed, the moisture-proof layer being formed on at least a portion of the wirings as well.

4. The radiation detector according to claim 1, wherein the light scattering particles have an average particle diameter of 1/10 to 10 times of a main fluorescence wavelength of the scintillator, and consist of one or more kinds of ceramics or metals.

5. The radiation detector according to claim 1, wherein the surface-smoothing layer has no particles on the side nearer to the moisture-proof layer.

6. The radiation detector according to claim 1, wherein the volume fraction of the light scattering particles satisfies the following equation on the side nearer to the scintillator layer:
    volume of light scattering particles/volume of organic resin material≥1.0.

7. The radiation detector according to claim 1, wherein the volume fraction of the light scattering particles satisfies the following equation on the side nearer to the moisture-proof layer:

volume of light scattering particles/volume of organic resin material<1.0.

8. The radiation detector according to claim 1, wherein the light scattering particles are made from titanium oxide.

9. A method for manufacturing a radiation detector, comprising:

forming a scintillator layer on a surface of an array substrate comprising a photoelectric conversion element, the scintillator layer converting radiation to fluorescence;

forming a first surface-smoothing layer to cover the scintillator layer, the surface-smoothing layer being formed by coating of a first organic resin liquid comprising light scattering particles on the scintillator layer and drying the first organic resin liquid;

forming a second surface-smoothing layer to cover the first surface-smoothing layer, the second surface-smoothing layer being formed by coating of a second organic resin liquid comprising the light scattering particles on the first surface-smoothing layer and drying the second organic resin liquid, a volume fraction of the light scattering particles of the second organic resin liquid being lower than a volume fraction of the light scattering particles of the first organic resin liquid, a total thickness of the first and second surface-smoothing layers being not less than an unevenness of the scintillator layer; and forming a moisture-proof layer which is a continuous film formed on a surface of the second surface-smoothing layer by direct film formation of inorganic material.

10. The method for manufacturing the radiation detector according to claim 9, wherein in the forming the surface-smoothing layer, an outermost surface of the surface-smoothing layer is smoothed by applying a coating liquid on the scintillator layer and drying the liquid, the coating liquid including an organic resin and solvent having a boiling point of 100° C. or more.

11. The method for manufacturing the radiation detector according to claim 9, wherein in the forming the moisture-proof layer, the moisture-proof layer is formed by a physical vapor deposition method (PVD method) or a chemical vapor deposition method (CVD method), and the moisture-proof layer includes at least one selected from the group of a metal film, a oxide film, a nitride film, an oxynitride film, and a composite film of the metal film, the oxide film, the nitride film and the oxynitride film.

12. The method for manufacturing the radiation detector according to claim 9, wherein before forming the moisture-proof layer, the surface-smoothing layer is heated up to a preferred high temperature and held to promote outgassing from the surface-smoothing layer, then cooled down to a lower temperature, and thereafter the moisture-proof layer is formed on the surface-smoothing layer.

13. The method for manufacturing the radiation detector according to claim 9, further comprising:

before forming the moisture-proof layer, connecting wirings from external circuits to bonding pads of lead-wirings provided on the array substrate in a periphery of a region where the scintillator layer is formed.

14. A method for manufacturing a radiation detector, comprising:

forming a scintillator layer on a surface of an array substrate comprising a photoelectric conversion element, the scintillator layer converting radiation to fluorescence;

forming a first surface-smoothing layer to cover the scintillator layer, the surface-smoothing layer being formed by coating of a first organic resin liquid comprising light scattering particles on the scintillator layer and drying the first organic resin liquid;

forming a second surface-smoothing layer to cover the first surface-smoothing layer, the second surface-smoothing layer being formed by coating of a second organic resin liquid comprising no light scattering particles on the first surface-smoothing layer and drying the second organic resin liquid, a total thickness of the first and second surface-smoothing layers being not less than an unevenness of the scintillator layer; and forming a moisture-proof layer which is a continuous film formed on a surface of the second surface-smoothing layer by direct film formation of inorganic material.

* * * * *